Jan. 14, 1930.
F. C. MONTUORI
1,743,563
COMBINATION RING AND KEY
Filed Jan. 14, 1928
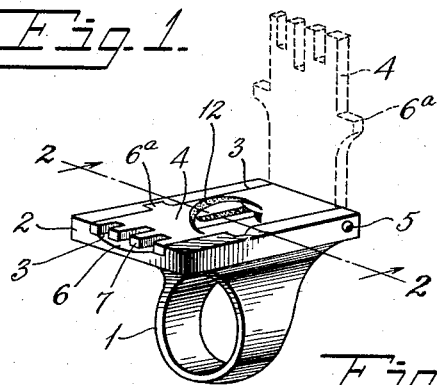
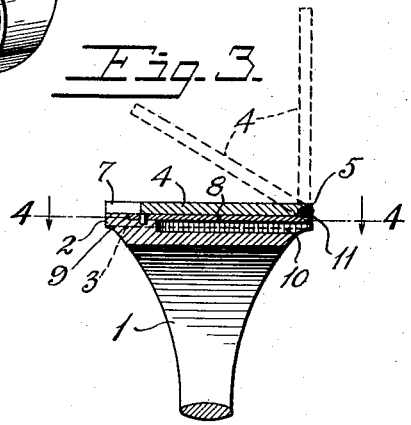
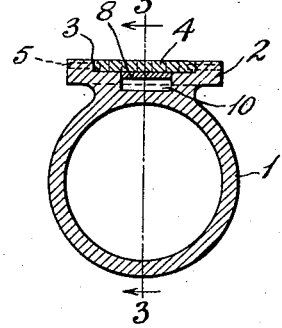
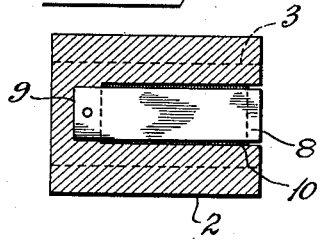
Inventor
Felix C. Montuori
Low & Low
Attorneys
By:

Patented Jan. 14, 1930

1,743,563

UNITED STATES PATENT OFFICE

FELIX C. MONTUORI, OF WASHINGTON, DISTRICT OF COLUMBIA

COMBINATION RING AND KEY

Application filed January 14, 1928. Serial No. 246,883.

The invention relates to a combined ring and key device in which the bezel of the ring constitutes a key retaining member. The invention relates more particularly to such a device which may be worn at all times by the owner of an automobile so that the key for releasing the ignition or other automobile lock is constantly at hand and available for use.

The invention contemplates as an important object the provision of an ornamental or seal ring on which the monogram or fraternal insignia of the wearer is or may be present. The key device is normally housed within the ring and is removably secured thereto to permit the removal and insertion when desired of various keys. Once a key has been inserted it is usually carried indefinitely and will remain in use as long as the owner operates an automobile having a particular lock which the key has been constructed to operate. A further object of the invention is to provide a device of the character described in which the key is movably mounted on the ring and may be projected therefrom in order to be used for opening a lock. When not in use the key is moved to a retracted position in which it will lie substantially flush with the ring so as not to catch in the clothing or pockets of the wearer.

The key is preferably maintained in either a projected or retracted position by means of a suitable spring constructed and applied in any convenient manner.

The body of the ring is recessed so as to provide a channel for the reception of the key when not in use.

A device of this character is particularly useful in connection with automobile ignition systems or steering gear and transmission locks.

With such objects in view, as well as other advantages which may be incident to the use of the improvements, the invention consists in the parts and combinations thereof hereinafter set forth and claimed, with the understanding that the several necessary elements constituting the same may be varied in proportions and arrangement without departing from the nature and scope of the invention.

In order to make the invention more clearly understood there are shown in the accompanying drawings means for carrying the same into practical effect, without limiting the improvements, in their useful applications, to the particular constructions which, for the purpose of explanation, have been made the subject of illustration. In the said drawings:—

Fig. 1 is a perspective view illustrating a preferred embodiment of the invention.

Fig. 2 is a vertical section on line 2—2 of Fig. 1.

Fig. 3 is a similar sectional view on line 3—3 of Fig. 2.

Fig. 4 is a transverse section on line 4—4 of Fig. 3.

Referring to the drawings, the ring member is indicated at 1 and preferably consists of a heavy finger ring of the well known seal or signet type. The bezel of the ring is shown at 2 and, in the embodiment illustrated, is of rectangular shape and provided with a longitudinal recess 3 extending for the entire length of the bezel portion 2. A key 4 of substantially the same dimensions and thickness of the recess 3 is normally housed within said recess, and at one end is pivoted or provided with trunnions 5 movably holding the key in the recess. The construction and arrangement is such that when in inoperative position the key lies flat within the recess 3 substantially flush with the top of the recess, and when in operative position the key is swung on its pivotal mounting into a vertical position as shown in dotted lines in Figs. 1 and 3. If desired, the free end of the key may project very slightly past the end of the bezel portion 2 of the ring to facilitate its being grasped and moved into operative position. As illustrated the end of the bezel portion is slightly grooved at 6 to admit the fingernail for the purpose described, in which instance the end of the key may be flush with the end of the ring. The key is further provided with the usual wards 7 on its free end for registry with the particular ignition or other lock which the key is designed to control.

In the embodiment illustrated the key member is provided with the usual lateral lugs or projections 6ª to limit the inward movement of the key in the lock, which projections are housed in properly located offset portions of the recess 3 in the bezel.

A leaf spring member 8 is provided to bear against the key 4 to yieldingly maintain said key within the recess 3 and in upright position when the key has been moved to the latter operative position. The leaf spring is soldered or secured within a cut out portion 9 of the bezel and the bezel portion is further cut away as at 10 to permit movement of the free end of the spring when the key member is moved to projected or retracted position. The spring, however, will be constructed and applied in any desired manner.

It will be seen that when the key is lying flat in the recess, the free end of the spring 8 contacting with the key maintains the latter in its depressed position. When the key is moved or swung upwardly the squared corner 11 of the same moves downwardly in an arc and the free end of the spring yields to permit this movement (Fig. 3). When the key has been lifted to upright or operative position the free end of the spring, which remains in contact with the key member, rests against the squared end of the key and yieldingly maintains the latter in vertical position. It will be understood that the invention contemplates the provision of a spring member which is separate from or integral with the ring.

If desired the upper face of the key may be engraved or provided with the personal monogram of the owner, coat of arms, or the insignia of a lodge or fraternal organization. Such insignia is shown in the illustration at 12. In such instance the entire device becomes attractive in appearance and distinctly ornamental as well as useful. The ring may be worn on any desired finger and entirely obviates the inconvenience resulting from the loss or misplacement of the automobile key, as now frequently occurs. When the key is moved to upright or operative position the user merely inserts the same in the ignition or other lock to release the mechanism and thereafter returns the key to normal, inoperative position, with the result that the device now resembles merely an ornamental or seal ring. The structure is such that there are no projections likely to engage or catch in the clothing or pockets of the wearer.

The invention further contemplates the provision of a combined ring and key device in which the key element is rigidly secured to the face of the ring, but is slightly elevated to permit the same to be inserted by a forward thrust directly into the lock. In the latter instance these locks are of the spring released tubular character and are spring projected out of their retaining recess when the tumbler mechanism has been released by engagement with the wards on the end of the key. When locks of the latter described character are used, it is not necessary to pivotally mount the key upon the face of the ring.

What I claim is:

1. A finger ring having a key pivotally mounted thereon and adapted to be moved into a position projecting therefrom for insertion in a lock, and separate spring tension means arranged under the key and over a portion of the ring for yieldably maintaining the key in projected and retracted position.

2. A finger ring comprising a bezel portion having a slot or recess formed therein, a key pivotally mounted at one end in said recess and adapted to be moved to and from a position projecting from the ring and the recess in which said key lies, and a leaf spring secured to the bezel of the ring for engaging with said key for yieldingly maintaining said key in a projected and retracted position.

3. A finger ring having a bezel portion and a recess therein, a key pivotally mounted at one end on the bezel portion and foldable into said recess, and a separate spring member secured in the bottom of said recess and having its free end engaging said key to yieldingly maintain the same in retracted and projected position.

In testimony whereof I affix my signature.

FELIX C. MONTUORI.